Dec. 10, 1968  E. H. MOORE  3,415,119
VISUAL FLOW INDICATOR
Filed Oct. 11, 1965
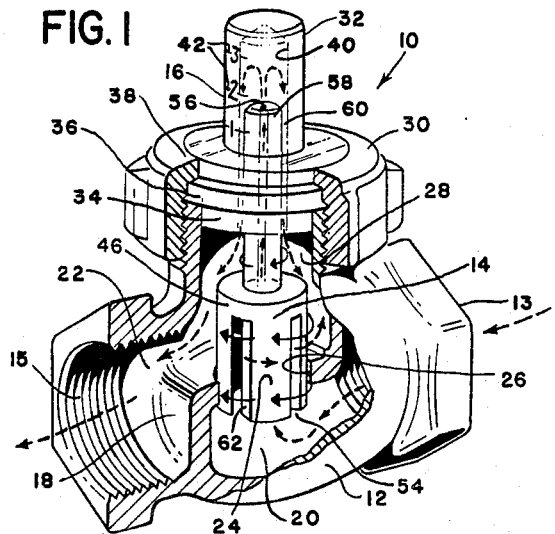
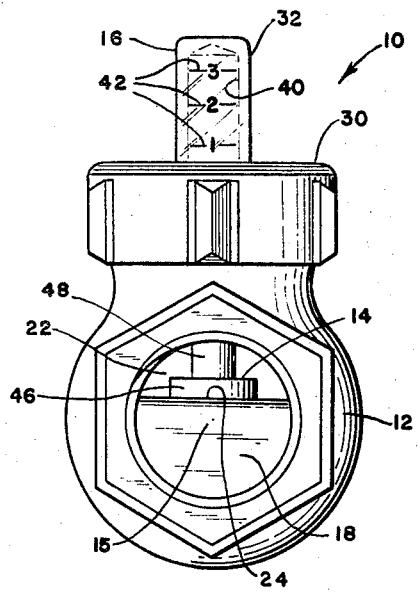
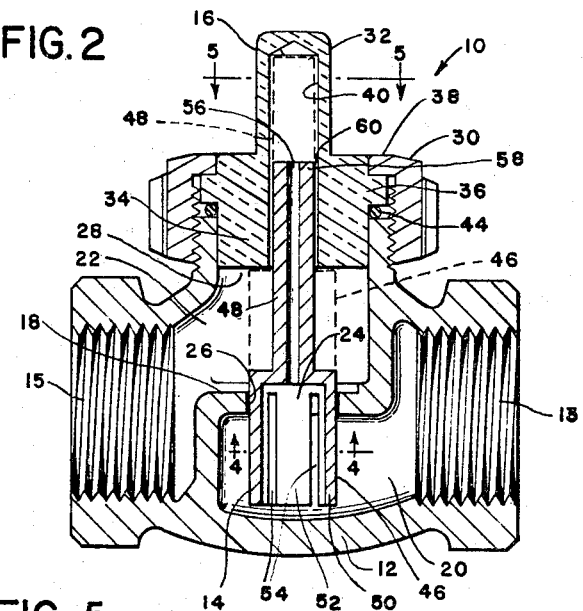
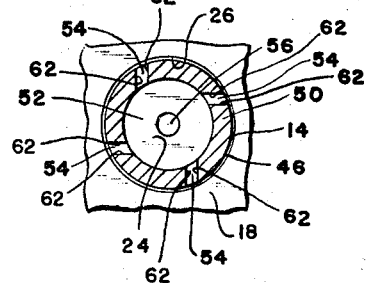
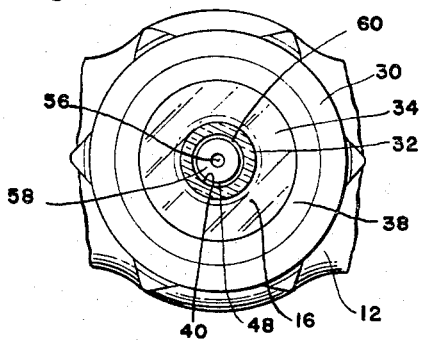
INVENTOR.
EDWARD H. MOORE
BY
McCormick, Paulding & Huber
ATTORNEYS

United States Patent Office 3,415,119
Patented Dec. 10, 1968

3,415,119
VISUAL FLOW INDICATOR
Edward H. Moore, Avon, Conn., assignor to The Gems Company, Inc., Farmington, Conn., a corporation of Delaware
Filed Oct. 11, 1965, Ser. No. 494,692
13 Claims. (Cl. 73—208)

ABSTRACT OF THE DISCLOSURE

A visual flow indicator having a hollow housing which provides a path of flow for a fluid to be indicated contains an indicator element which both rotates and axially translates in response to flow of the fluid through the housing. The relative movement of the indicator element may be viewed through a transparent dome which forms a part of the housing.

---

This invention relates in general to fluid flow indicators and deals more particularly with flow indicators of the visual indicator type.

The general object of the invention is to provide a device of the aforedescribed character which clearly indicates the presence of a fluid flow therethrough and which further indicates the rate thereof.

Another object of the invention is to provide a fluid flow indicating device readily adapted for use with existing liquid conduit systems.

A further object of the invention is to provide a visual flow indicator of simple and yet durable design and construction which may be manufactured at low cost.

Other objects and advantages of the invention will be apparent from the following description and from the drawing forming a part thereof.

The drawing shows a preferred embodiment of the invention and such embodiment will be described, but it will be understood that various changes may be made from the construction disclosed, and that the drawing and description are not to be construed as defining or limiting the scope of the invention, the claims forming a part of this specification being relied upon for that purpose.

Of the drawing:

FIG. 1 is a perspective view of a flow indicator embodying the present invention, a portion of the housing being shown in section to reveal the indicator element.

FIG. 2 is a vertical axial section through the flow indicator of FIG. 1, the indicating element being shown in a position corresponding to a condition of no flow, a position corresponding to a condition of maximum flow indication being shown by broken lines.

FIG. 3 is an end view of the fluid indicator of FIG. 1 looking toward the right of FIG. 2 or toward the fluid outlet port.

FIG. 4 is a somewhat enlarged sectional view taken along the line 4—4 of FIG. 2.

FIG. 5 is a sectional view taken along the line 5—5 of FIG. 2.

Referring particularly to FIGS. 1 and 2 of the drawing, a flow indicator embodying the invention is illustrated and designated generally by the reference numeral 10. The flow indicator 10 generally comprises a hollow housing 12 which provides path of flow for a fluid to be indicated and which contains an indicator element 14 which both rotates and axially translates in response to the flow of fluid through the device. The housing includes a reference portion or dome 16 which is at least partially transparent and through which the relative movement of the indicator element can be viewed.

The housing may vary in shape and may be made from a variety of different materials but preferably and as shown a conventional T-shaped cast metal globe valve casing forms the housing 12. The device is adapted to be connected in series with a conduit or pipeline containing a fluid flow to be indicated and for this purpose the housing includes an inlet port 13 and an outlet port 15 which are internally threaded to receive conventionally threaded piping. Valve casings having various port arrangements may be used in practicing the invention; however, in the presently preferred embodiment the ports are coaxially aligned to provide a generally longitudinal path of flow through the device.

A generally transversely extending partition 18 provides a means for dividing the interior of the housing 12 into a first chamber 20 communicating with the inlet port 13 and a second chamber 22 communicating with the outlet port 15. The dividing means or partition 18 has an aperture 24 through which fluid is constrained to pass in flowing from the inlet port 13 to the outlet port 15. In the illustrated embodiment, the aperture 24 is generally cylindrical, corresponding to a valve seat opening in a globe valve casing, and has a generally cylindrical aperture defining wall 26 which serves as a bearing and guide surface for the indicator element 14 to be hereinafter further described.

The housing 12 also includes an opening 28 extending therethrough in communication with the second chamber 22 and in general alignment with the aperture 24. Preferably, the opening 28 is also generally cylindrical and is coaxially aligned with the aperture 24. In the globe valve casing which forms the housing 12 the opening 28 corresponds to an opening conventionally provided for receiving the stem of a valve. An outwardly projecting generally cylindrical portion of the valve casing or housing 12 which surrounds the opening 28 is externally threaded to receive an annular retaining nut 30.

The dome 16 which is attached to the housing 12 and which is separable therefrom is made from a transparent material such as clear plastic or glass, the latter material being preferable.

The dome includes a generally cylindrical reference portion 32 which extends outwardly from the housing 12 and a coaxially aligned enlarged cylindrical base portion 34 which is partially received within the cylindrical opening 28 and which provides a closure therefor. A radially outwardly projecting annular flange 36 integrally formed upon the base portion 34 cooperates with a radially inwardly projecting annular shoulder 38 on the retaining nut 30 for securing the dome to the housing.

The dome 14 also has an inwardly opening bore 40 which communicates with the second chamber 22. Preferably the bore 40 is generally cylindrical and coaxially aligned with the aperture 24. A reference means 42 carried by the dome preferably comprises indicia of fluid flow rate.

To provide a fluid-tight seal between the housing and the dome it is preferred that gasket material or a suitable seating compound be located intermediate the annular flange 36 and the housing 12 and it is for this purpose that an annular gasket 44 is provided.

Both the presence of a fluid flow in the device and the rate of fluid flow therethrough are indicated by the rotatable indicator element or spindle 14 at least a portion of which is visible through the dome 16. The spindle is received in the aperture 24 and is constructed and arranged for axial rotation and axial translation therein in response to a flow of fluid through the device.

Preferably and as shown the spindle 14 has a generally cylindrical body 46 and includes a generally cylindrical stem 48 of substantially smaller diameter which extends coaxially outwardly from the body.

The body includes an annular wall 50 which defines an inwardly opening bore 52 and a plurality of angularly spaced generally axially extending slots 54, 54 which will hereinafter be further discussed. A coaxially extending passageway 56 through the stem 48 communicates with the bore 52. It should also be noted that the stem includes an outer end portion 58 which cooperates with the reference means 42 to indicate the axial movement of the spindle relative to the housing in a manner which will be hereinafter evident.

The spindle is supported for rotational and axial movement in the aperture 24 by the wall 26 which closely surrounds the body 46 to provide a guide and bearing surface therefor. The stem 48 is loosely received within and extends for some distance into the bore 40 which generally supports it for rotational movement and guides it for axial movement.

To minimize friction and thereby facilitate the free axial and rotational movement of the stem within the bore 40 under substantially all operational conditions, lubrication of the stem is preferably provided for by the passageway 56 which provides a path for lubricating fluid flow from the first chamber 20 to the bore 40. A path of return flow from the bore 40 to the second chamber 22 is provided by a clearance 60 which exists between the cylindrical surface of the bore 40 and the peripheral surface of the stem 48 as best shown in FIG. 1, the path of fluid flow through the device being indicated by the broken arrows. Thus, as the device operates at least some of the fluid tends to flow or at least seep downwardly through the clearance 60 to serve as a lubricant for the stem.

At this point it should be noted that as fluid flows through the device at least some fluid tends to occupy the space between the outer end of the bore 40 and the stem outer end portion 58. The fluid confined in this space tends to provide a dash-pot effect which causes the spindle to smoothly axially translate in response to fluid flow fluctuation.

The spindle 14 is axially movable through a range of positions between a first position corresponding to a no-flow condition and indicated by the solid line position of FIG. 2 and a second position indicated by broken lines and corresponding to a condition of maximum flow indication.

Axial movement of the spindle 14 is effected by a differential in fluid pressure between the fluid which flows in the first and second chambers. A means for effecting such a pressure differential is provided by at least one passageway through the spindle for communicating between the first and second chambers to provide a path of flow to the second chamber.

In the presently preferred embodiment a plurality of passageways or slots 54, 54 provide the means for effecting a pressure differential. The slots may be arranged to communicate between the first and second chambers in all spindle positions, however, it will be noted that in the illustrated embodiment the slots 54, 54 do not effectively communicate with the second chamber 22 when the spindle is in the first position. Movement of the spindle toward the second position which brings the slots into communication with the second chamber is initiated by an initial surge or flow of fluid through the inlet opening 13 into the first chamber 20. Thereafter, a path of flow is established through the slots 54, 54 to the second chamber 22. It will be noted that the slot area in communication with the second chamber increases as the spindle 14 moves toward the second position.

In response to the flow of fluid through the device the spindle tends to move toward the second position and to assume a position relative to the flow condition in the device. It will now be evident that the stem end portion 58 which is visible through the dome 16 cooperates with the indicia 42 to indicate the relative position of the spindle and thereby provide an indication of the rate of fluid flow through the device.

In the presently preferred embodiment of the invention, the spindle 14 is biased toward the first position by the force of gravity. Thus, it will be evident that the flow indicator of the illustrated embodiment is particularly adapted for operation in an axially vertical or near vertical position.

However, the flow indicator of the present invention is not limited to axially vertical installation and where a biasing means other than the force of gravity is provided the device may be inserted anywhere in a conduit or pipeline containing a fluid flow to be indicated. Such embodiments are considered to be within the scope of the invention.

It will be noted that each of the slots 54, 54 is defined by at least one wall 62 which is inclined to a radial plane. Preferably and as shown two walls 62, 62 which partially define each of the slots 54, 54 are arranged in parallel alignment so that each of the slots provide a passageway which has at least a discharge end portion inclined to the radial direction. Thus, fluid flows from each of the slots 62, 62 to the second chamber 22 in a generally tangential direction relative to the spindle 14. An associated portion of the bore 52 provides a fluid reaction surface against which the flowing fluid acts to cause spindle rotation. The rate of spindle rotation tends to increase as the spindle moves toward the second position. The rotational movement of the stem outer end portion 58 which is visible through the dome 16 provides indication of the presence of a fluid flow in the device as well as assurance that the device is properly functioning.

The invention claimed is:

1. A flow meter comprising a hollow housing having a fluid inlet port and a fluid outlet port, said ports being adapted for connection with a conduit, means dividing the interior of said housing into a first chamber communicating with said inlet port and a second chamber communicating with said outlet port, said dividing means having an aperture through which fluid is constrained to flow in passing from said inlet port to said outlet port, a rotatable pressure responsive indicator element, means slidably engaging and supporting said element for axial pressure responsive movement in said aperture through a range of positions between a first position corresponding to a no-flow condition and a second position corresponding to a maximum flow indicating condition, said indicator element including at least one passageway therethrough for providing a fluid flow path from said first to said second chamber, said element being so constructed and arranged that the area of said passageway open to flow from said first to said second chamber varies as said element moves axially, said indicator element being biased toward said first position and having at least one fluid reaction surface arranged to effect anti-friction rotation of said indicator element relative to its said support means in response to the flow of fluid from said inlet port to said outlet port, said indicator element tending to move toward said second position in response to the flow of fluid through said passageway, and means for indicating the movement of said indicator element toward and away from said second position.

2. A flow meter comprising a hollow housing having a fluid inlet port and a fluid outlet port, said ports being adapted for connection with a conduit, means dividing the interior of said housing into a first chamber communicating with said inlet port and a second chamber communicating with said outlet port, said housing including a reference portion defining an inwardly opening bore communicating with said second chamber, said reference portion being at least partially transparent, said dividing means having an aperture through which fluid is constrained to pass in flowing from said inlet port to said outlet port, a rotatable indicator element axially movable in said aperture through a range of positions between a first position corresponding to a no-flow condition and a second position corresponding to a maximum flow indicating condition, said indicator element including a stem having an end portion received in said bore and visible through the transparent part of said reference portion, said indicator element having at least one passageway therethrough communicating between said first and second chambers with at least a discharge end portion thereof inclined to the radial direction, said indicator element being biased toward said first position and having at least one fluid reaction surface arranged to effect rotation of said indicator in response to the flow from said inlet port to said outlet port, said indicator element tending to rotate and to move toward said second position in response to flow of fluid through said passageway to said second chamber, and means for indicating movement of said indicator element toward and away from said second position.

3. The combination defined in claim 2 further characterized by said reference portion being a transparent dome attached to said housing and separable therefrom.

4. The combination defined in claim 2 wherein said means for indicating the movement of said indicator element comprises reference means carried by said reference portion and cooperating with said end portion to provide indication of the relative position thereof.

5. The combination defined in claim 2 further characterized by said stem defining a generally axially extending passageway communicating with said bore and with said first chamber to provide a path of flow from said first chamber to said bore.

6. The combination defined in claim 5 wherein said bore is generally cylindrical, said stem being generally cylindrical and being loosely received in said bore so that the clearance between said stem and said bore provides a path of lubricational flow therebetween.

7. The combination defined in claim 1 wherein said indicator element includes a generally cylindrical body portion, said aperture defining a generally cylindrical wall surrounding said body portion for journaling said body portion and for guiding said body portion for axial movement in said aperture.

8. A flow meter comprising a hollow housing having a fluid inlet port and a fluid outlet port, said ports being adapted for connection with a conduit, means dividing the interior of said housing into a first chamber communicating with said inlet port and a second chamber communicating with said outlet port, said dividing means having a generally cylindrical wall defining an aperture through which fluid is constrained to flow in passing from said inlet port to said outlet port, a rotatable indicator element axially movable in said aperture through a range of positions between a first position corresponding to a no-flow condition and a second position corresponding to a maximum flow indicating condition, said indicator element having a generally cylindrical body portion surrounded by said cylindrical wall, said cylindrical wall serving to journal said body portion and guide it for axial movement relative to said housing said body portion including an annular wall defining a downwardly opening bore communicating with said first chamber and having an axially extending slot therethrough for communicating between said first and second chambers, said indicator element being biased toward said first position and tending to move toward said second position in response to the flow of fluid through said slot, said indicator element having at least one fluid reaction surface arranged to effect element rotation in response to the flow of fluid from said inlet port to said outlet port, and means for indicating the movement of said indicator element toward and away from said second position.

9. The combination defined in claim 8 further characterized by at least one wall of said slot being inclined to a radial plane.

10. A flow meter comprising a hollow housing having a fluid inlet port and a fluid outlet port, said ports being adapted for connection with a conduit, means dividing the interior of said housing into a first chamber communicating with said inlet port and a second chamber communicating with said outlet port, said dividing means including a wall defining a generally cylindrical aperture through which fluid is constrained to flow in passing from said inlet port to said outlet port, an indicator element including a generally cylindrical body portion, said body portion being received in said aperture for axial and rotational movement therein, said body portion having an annular wall defining a generally downwardly opening bore communicating with said first chamber, said annular wall defining a plurality of angularly spaced axially extending slots for communicating between said first and second chambers, each of the said slots having at least one wall thereof inclined to a radial plane, said indicator element being axially movable through a range of positions between a first position corresponding to a no-flow condition and a second position corresponding to a maximum flow indicating condition, said indicator element being biased toward said first position and tending to rotate and to move toward said second position in response to flow of fluid through said slots to said second chamber, and means for indicating movement of said indicator element toward and away from said second position.

11. The combination defined in claim 1 wherein said passageway has at least a discharge end portion inclined to the radial direction.

12. The combination defined in claim 1 wherein at least a portion of said housing is transparent, said indicator element being at least partially visable through said transparent portion to permit observation of the rotational and axial movement thereof.

13. The combination defined in claim 1 wherein said indicator element in all of its positions substantially blocks the direct flow of fluid through said aperture, said passageway providing an indirect flow path through said aperture and along which path substantially all of the fluid which flows from said inlet port to said outlet port is constrained to flow.

References Cited

UNITED STATES PATENTS

| | | | |
|---|---|---|---|
| 299,737 | 6/1884 | Chapin | 73—208 |
| 965,915 | 8/1910 | Lea | 73—207 X |
| 1,173,395 | 2/1916 | Taylor | 73—208 X |
| 2,069,309 | 2/1937 | Henszey | 73—208 |
| 2,293,478 | 8/1942 | Stevenson | 73—203 |

RICHARD C. QUEISSER, Primary Examiner.

U.S. Cl. X.R.

116—117